No. 802,050. PATENTED OCT. 17, 1905.
C. M. P. G. LUNGWITZ.
ELASTIC WHEEL.
APPLICATION FILED SEPT. 3, 1904.

2 SHEETS—SHEET 1.

Attest
F. R. Fitton
J. W. Riley

Inventor
Carl M. P. G. Lungwitz
by William F. Hall
his atty.

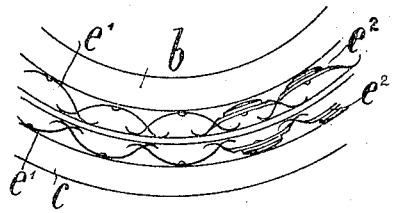
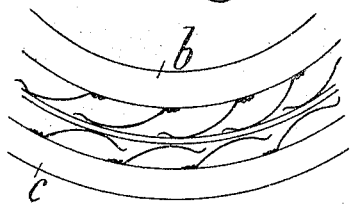
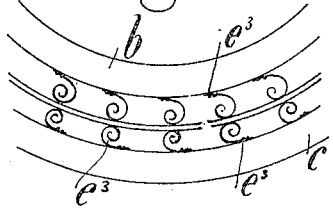
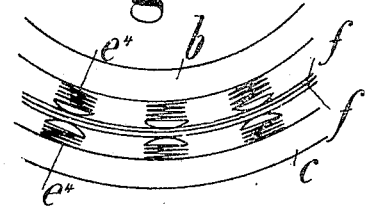
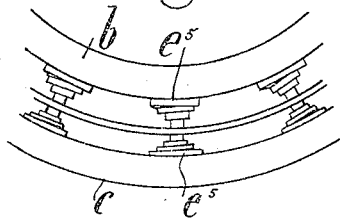
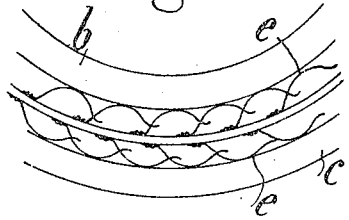
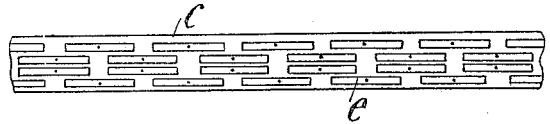

UNITED STATES PATENT OFFICE.

CARL MORITZ PAUL GEORG LUNGWITZ, OF CASSEL, GERMANY.

ELASTIC WHEEL.

No. 802,050.     Specification of Letters Patent.     Patented Oct. 17, 1905.

Application filed September 3, 1904. Serial No. 223,193.

*To all whom it may concern:*

Be it known that I, CARL MORITZ PAUL GEORG LUNGWITZ, a subject of the Emperor of Germany, residing at Cassel, in the Province of Hesse-Nassau, Kingdom of Prussia, Germany, have invented certain new and useful Improvements in Elastic Wheels, of which the following is a specification, reference being had therein to the accompanying drawings.

My invention relates to elastic wheels of that kind in which two concentric fellies or felly-rings and a plurality of springs between them are employed for a single wheel.

My invention relates to improvements in such elastic wheels; and the objects of my improvement are, first, to render the two concentric fellies within certain limits independent of each other in their common plane; second, to provide screens on both sides of the wheel for preventing the two fellies from lateral displacement; third, to provide one or several hoops between the two fellies and concentric with them, and, fourth, to provide a plurality of springs in the spaces between the external felly and the hoop or hoops and between the latter and the internal felly. I attain these objects by the constructions illustrated in the accompanying drawings, in which—

Figure 1:
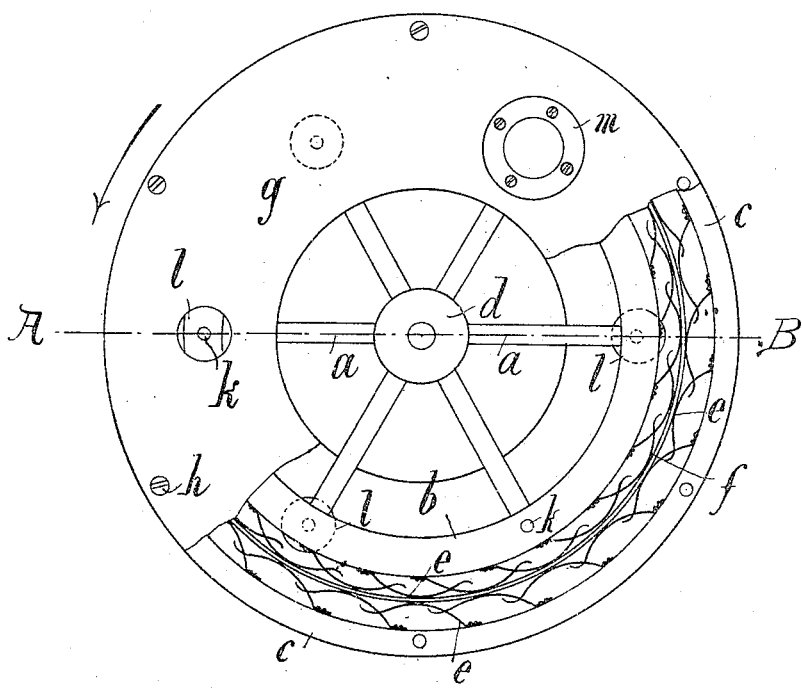
Figure 2:
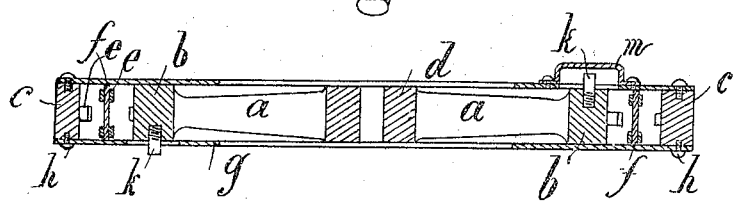

Figure 1 is an elevation of an elastic wheel, the front screen being partially removed. Fig. 2 is a horizontal section through the same on the line A B in Fig. 1. Figs. 3 to 8 show modifications of the springs inserted between the two fellies and the hoop or hoops, and Fig. 9 is a development of part of either felly to show the arrangement of the springs.

Similar letters of reference refer to similar parts throughout the several views.

The elastic wheel shown at Figs. 1 and 2 comprises a complete internal wheel, which is similar to ordinary car-wheels, and consists of the felly $b$, the several spokes $a\ a$, and the hub $d$. This internal wheel is surrounded by an external felly $c$, which is provided on both sides with two annular screens $g\ g$ to prevent the former from lateral displacement. The screens $g\ g$ are secured on the external felly $c$ by means of screws $h\ h$, or they may be secured in any known manner—for example, by means of rivets passing right through the felly $c$. The two screens $g\ g$ are shown as provided each with three circular apertures $l\ l$, the apertures in the one screen preferably alternating with those in the other screen. The internal felly $b$ is provided on either side with three pins $k\ k$, which engage in the three apertures $l\ l$ of the adjacent screen $g$. Preferably the apertures $l\ l$ are covered with caps $m\ m$, so as to keep off any dust or dirt. Between the two fellies $b$ and $c$ a hoop $f$, of elastic material—such as steel, wood, or the like—is placed, which is prevented from lateral displacement by the two screens $g\ g$. In either space between the external felly $c$ and the hoop $f$ and between the latter and the internal felly $b$ a plurality of leaf-springs $e\ e$ are disposed, which are each secured with the one end on the respective felly. The springs $e\ e$ may be arranged in several rows in a similar manner, as is shown at Fig. 9. It is immaterial in which order the springs and the spring-rows are arranged.

The wheel is operated as follows: When the vehicle is assumed to move from right to left in Fig. 1 and the wheel to revolve in the direction of the arrow, then the springs $e\ e$ in the lower part of the wheel near the vertical center line will be most depressed by the load on the axle-pin in the hub $d$, while the neighboring springs $e\ e$ on either side are the less depressed the farther they are from the vertical center line. It is evident that during the revolution of the wheel the several springs $e\ e$ in the lower half of the wheel will constantly slide on the intermediate hoop $f$, while they remain at liberty to freely bend without disturbing each other. Should from any reason the vertical central plane of the wheel be a little inclined and should the external felly $c$ in contact with the soil a little yield, be it by reason of its elasticity, then the lowermost springs $e\ e$ on the side toward which the wheel is inclined will be more depressed than those on the other side. This is also permissible, owing to the arrangement of the springs $e\ e$, which do not disturb each other, so that they are not liable to bending to either side, and thereby getting into disorder. Thus the vehicle can be turned to either side without disadvantage to the wheel. When the vehicle is supposed to be drawn by an animal and now to be stopped, then the animal will exert a horizontal pressure upon the internal wheel in the direction from left to right, so that the resultant of this force and the load will depress the springs $e\ e$ in the lower right quarter of the wheel, while the external felly $c$, with the two screens $g\ g$, by reason of its living force, will continue to move from right to left. This means that the springs $e\ e$ will slide on the internal and the external faces of the hoop $f$, so that the internal wheel—in other words, the internal felly $b$—will displace itself with regard to the external felly $c$. This displacement is soon checked either by the retardation and stoppage of the external felly $c$ under the action of the depressed springs $e\ e$ or by the pins $k\ k$ on the internal felly $b$ striking against the edges of the circular apertures $l\ l$. During the whole time the load on the axle-pin in the hub $d$ is supported elastically and protected from shocks. When the animal again starts, it will exert a horizontal force on the vehicle and move it, with the internal wheel, from right to left, while the external felly, with the two screens $g\ g$, stops by reason of its inertia. The consequence is that the internal felly $b$ displaces itself with regard to the external felly $c$, while the latter is afterward put into motion and accelerated by the depressed springs $e\ e$ until the pins $k\ k$ on the internal felly $b$ strike against the opposite sides of the apertures $l\ l$ and henceforward bear on the same. Thus all shocks are avoided during the start of the vehicle.

Obviously the wheel will operate much in the same manner if the hub is secured on a shaft the same as in an automobile and turned mechanically, the only difference being that the horizontal forces acting upon the wheel during the start and the stoppage of the vehicle are in the respective opposite directions.

The hoop $f$ affords the advantage that it distributed the forces over a considerable number of the springs, and thus prevents them from being excessively bent.

It is immaterial of what kind the springs $e\ e$ are and whether they are secured on the two fellies $b$ and $e$, as in Figs. 1 and 4, or on the hoop $f$ alone, as in Fig. 8. Instead of on the one end the leaf-springs may be secured at their middles, as is shown at Fig. 3. Such leaf-springs may be either single, as $e'\ e'$, on the left or multiple, as $e^2\ e^2$, on the right in Fig. 3. Instead of the leaf-springs spiral springs $e^3\ e^3$, as in Fig. 5, or helical springs $e^4\ e^4$, as in Fig. 6, or volute springs $e^5\ e^5$, as in Fig. 7, or springs of any other known kind may be employed.

The hoop $f$ may be single, as in Figs. 1 to 5, 7 and 8, or double, as in Fig. 6, or any other number of hoops $f$ encircling one another may be employed.

The screens $g\ g$ are shown to be full plates; but they may also be grates formed of a plurality of radially-placed rods secured with their external ends on the external felly $c$ and with their internal ends on concentric rings or flanges. The screens $g\ g$ may also be perforated or otherwise broken in any tasteful manner, so as to render the wheel light and pretty or beautiful. It is immaterial of what materials the two fellies $b$ and $c$, the spokes $a$, and the hub $d$ are made. The pins $k\ k$ may be secured on the screens $g\ g$ instead of on the internal felly $b$, as in Figs. 1 and 2, in which case the internal felly $b$ may be provided with recesses in which these pins $k\ k$ can engage, or the pins may be arranged to play in the space within the internal felly $b$ and to strike against suitable pins on the latter.

The elastic wheel may be varied in many respects to suit their purposes without deviating from the spirit of my invention. It may be used for perambulators, bicycles, invalid wheel-chairs, automobiles, or other vehicles.

The elastic wheel affords the following advantages: The strain on the springs is reduced to a minimum and is always in the right direction so that they do not break easily. The springs can be easily replaced when broken, as only a screen need be taken off. The vehicle can be started and stopped smoothly and without shocks.

What I claim as my invention, and desire to secure by Letters Patent, is—

As an article of manufacture, a wheel having a felly consisting of two concentric rings arranged with an interposed space, ring-disks arranged on opposite sides of the wheel, said disks being secured to the outermost ring and having portions arranged on opposite sides of the innermost ring and bridging said space between the two rings, a floating ring arranged in said space having its opposite edges coacting with said disks, whereby it is prevented from lateral displacement, and springs interposed between the felly-rings and said floating ring, substantially as described.

In testimony whereof I have affixed my signature in presence of two witnesses.

CARL MORITZ PAUL GEORG LUNGWITZ.

Witnesses:
OTTO KALETROH,
PAUL SCHMIDT.